Jan. 15, 1963 R. H. CARLSON 3,072,933
METHOD OF EXTRUDING SHANK PORTIONS WITH 50% OR LESS
CROSS-SECTIONAL AREA THAN THAT
OF THE ORIGINAL BLANKS
Filed Jan. 26, 1959 2 Sheets-Sheet 1

INVENTOR.
RAYMOND H. CARLSON
BY
BUCKHORN, CHEATHAM & BLORE
ATTORNEYS

Jan. 15, 1963 R. H. CARLSON 3,072,933
METHOD OF EXTRUDING SHANK PORTIONS WITH 50% OR LESS
CROSS-SECTIONAL AREA THAN THAT
OF THE ORIGINAL BLANKS
Filed Jan. 26, 1959 2 Sheets-Sheet 2

INVENTOR.
RAYMOND H. CARLSON
BY
BUCKHORN, CHEATHAM & BLORE
ATTORNEYS

United States Patent Office 3,072,933
Patented Jan. 15, 1963

3,072,933
METHOD OF EXTRUDING SHANK PORTIONS WITH 50% OR LESS CROSS-SECTIONAL AREA THAN THAT OF THE ORIGINAL BLANKS
Raymond H. Carlson, Rockford, Ill., assignor to Textron Industries, Inc., Rockford, Ill., a corporation of Delaware
Filed Jan. 26, 1959, Ser. No. 788,833
3 Claims. (Cl. 10—27)

The present invention relates to a method of forming metal articles. While the invention is suitable for the manufacture of screws, bolts and like fastening devices characterized by having an enlarged head and an elongated shank, the method of the invention facilitates the manufacture of a wide range of components of special shapes for the automotive, aircraft, electronic and other industries upon a high speed machine comparable to a cold heading machine. Many of such specially shaped parts could heretofore be made only upon a screw machine, or a combination of machines, at slow speed, with high material waste and at correspondingly high cost. Other of such parts had to be made heretofore in several pieces which were then assembled together into one unit. Thus while the process of the present invention can be used to considerable advantage in the manufacture of some products which were heretofore capable of manufacture upon conventional cold heading machines, it also enables the manufacture of other products upon high speed machines of this type which could not heretofore be so manufactured.

It is well known in the cold heading art that with a single upsetting stroke the maximum length of the portion which can be upset is about 2½ times the stock diameter. With two strokes stock length of from 2½ to 4½ times the stock diameter can be upset. Longer lengths are exceedingly difficult to upset and require multiple strokes. However, with more than two upsetting strokes it is generally necessary to perform an annealing operation before further upsetting can be done. Accordingly, it has been proposed heretofore by others to manufacture headed articles from blanks of relatively large diameter stock by extruding shank portions of reduced diameter and then finish forming the head by upsetting the previously unworked portion of the blank. Such methods invariably employed extrusion dies in which the transition from the blank diameter to the extruded shank diameter consisted of a straight conically tapered shoulder. Particularly in the case of blanks cut from steel wire or rod, such heavy pressures were required to extrude the blank that the blank tended to swell in the die cavity and galling would occur against the die side walls. Danger of splitting of the die, siezure of the part within the die and like problems made it quite impractical to attempt reductions of more than 50 percent in area with which the invention of the application is particularly concerned.

I have discovered that if the transition or shoulder between the large diameter and the small diameter of the extrusion die is concavely curved instead of straight, the amount of pressure required to cause the metal to flow through the extrusion orifice is greatly reduced. Very little, if any, swelling of the blank is observed and galling with the cavity side walls does not occur so that it has been found practical to make reductions much greater than heretofore deemed possible. Thus articles have been successfully produced in which the reduction made was of the order of 85 percent, that is, the cross-sectional area of the extruded shank portion was only approximately 15 percent that of the blank. No evidence of any galling or abrasion was observed on either the die or the workpiece.

Inasmuch as virtually no swelling of the unextruded portion of the workpiece occurs within the die during the extrusion process, binding does not occur and the extruded work part can be quickly and easily removed from the extrusion die. This enables the extrusion to be performed in high speed machines so as to enable production of extruded pieces at a relatively high rate.

A further advantage to be realized is that the cold working of the metal performed in accordance with the invention results in a very considerable increase in the tensile strength and yield strength of the worked metal enabling the use of mild carbon steels in products where formerly heat treatment or more expensive alloy steels were required.

The method of the invention also facilitates the manufacture of parts having one portion greatly enlarged with respect to another. As mentioned previously, such parts were sometimes formed in the past by assembling several pieces, but usually they are formed on a screw machine. The parts to which reference is here made cannot be formed by upsetting the end of a rod or wire stock on account of the large mass of metal required in the head portion. Wire stock tends to snake or fold when attempting to upset long lengths so that a poor grain structure is obtained and the resulting structure is inherently weak. With the process of the invention on the other hand, blanks of relatively large diameter can be partially extruded to form a shank portion of greatly reduced cross-sectional area while the remaining unworked portion can be worked as by mild upsetting to form the head part of the finished article. The grain structure of the resulting article will be such as to provide an article of superior strength qualities while the article can at the same time be produced at a much lower cost than required by previously used processes.

It is then an object of the present invention to provide a new and improved method of forming shaped metal articles.

Another object of the invention is to provide a method of producing shaped metal articles at low cost.

A more particular object is to provide a new and improved method for producing metal articles having an elongate shank and an enlarged head.

Another object is to provide a method for cold forming metal articles which could not be cold formed by methods utilized heretofore.

A still further object is to provide a method for producing metal articles having superior strength qualities.

Another object is to provide a method of producing metal articles from blanks wherein the blanks are cold worked in certain portions so as to improve the properties of the worked portions.

Other objects and advantages of the invention will become apparent in the following specification taken in conjunction with the accompanying drawings wherein.

Figure 1:
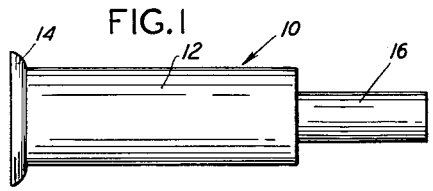
FIG. 1 is a side elevation of an article typical of those which are adapted to be manufactured by the process of the invention.
Figure 2:
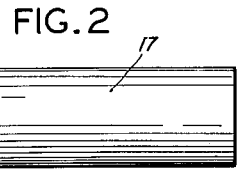
FIG. 2 is an elevation of the initial workpiece from which the article of FIG. 1 is formed.
Figure 3:
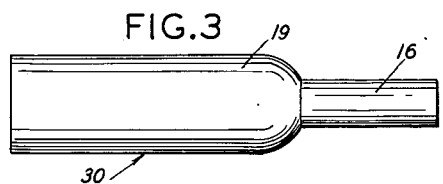
FIG. 3 is a view showing the shape of the workpiece after extrusion of a portion thereof.
Figure 4:
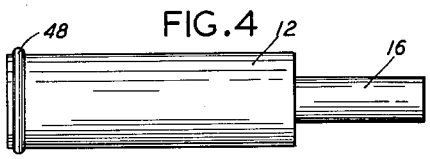
FIG. 4 is a view showing the shape of the workpiece after further working thereof.

Referring now to the drawings, FIG. 1 illustrates an article 10 typical of those which are adapted to be manufactured in accordance with the present invention, and FIGS. 2 to 7 illustrate the manufacture of the article. As will be observed, the article 10 comprises a cylindrical head part 12 having a flange 14 of greater diameter on one end and an elongate shank 16 of reduced diameter protruding from the opposite end thereof. The article 10 is a component used in the manufacture of electrical solenoids and is representative of those parts which heretofore have usually been made on screw machines. In accordance with the method of the invention, a cylindrical workpiece 17, such as shown in FIG. 2, of predetermined length is severed from a length of stock material (not shown) of predetermined diameter about twice that of the shank 16. Preferably, the volume of the severed workpiece is substantially equal to the volume of the article to be formed, though in some instances it may be necessary or desirable that the workpiece have a greater volume than the finished article, but one of the advantages of the invention is that in numerous and perhaps most instances no excess material need be utilized. After severing of the workpiece 17, it is positioned in an extrusion die 18, such as that more particularly shown in FIG. 5, and a portion of the workpiece 17 extruded to form the shank portion 16 of the article leaving a substantially unworked head part 19 as shown in FIG. 3.

In FIGS. 5 to 7 and 12 to 14, inclusive, only the die inserts are shown, and which in standard practice would be mounted in die casings. For convenience, however, these inserts will be referred to simply as dies or die blocks.

Figure 5:
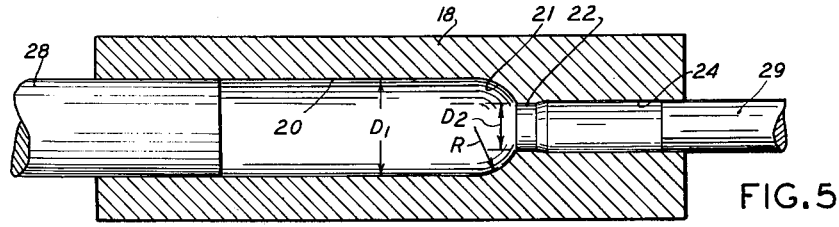
FIG. 5 is a sectional view showing the extrusion die utilized in the process of the invention.

Referring now to FIG. 5, the extrusion die 18 utilized in accordance with the present invention comprises a die block formed with a cavity including a substantially straight, or cylindrical, side wall portion 20 of a diameter $D_1$ sufficient to admit the workpiece 17, the length of the cylindrical side wall portion 20 being slightly greater than that of the workpiece 17. The inner end of the cavity is formed with an inwardly converging, concavely curved shoulder or surface 21 which terminates at an extrusion orifice 22 having a diameter $D_2$ substantially equal to that of the shank 16. The cylindrical section defining orifice 22 is preferably relatively short in length and opens into a receiving cavity 24 of slightly greater diameter than the orifice and into which the extruded shank 16 may proceed freely during the extrusion process.

The precise radius of curvature, indicated at R, of the curved shoulder 21 is by no means critical and may be varied considerably. In general, a rather large radius is preferred, particularly when working with tough alloy metals or when the shape of the finished product does not require a sharp transition between the head and the shank. Without specifying such relationship by way of limitation, I have found it preferable to provide a radius of curvature R which is no greater than the difference between the diameter $D_1$ of the large cylindrical section 20 and the diameter $D_2$ of the orifice defining section 22. Under certain circumstances, such as when working with softer metals, or for other reasons, it may be desired to have as short a radius of curvature as possible for the curved wall portion 21. I have found it generally undesirable to reduce the radius of curvature substantially below a length equivalent to one-half the difference of the diameters $D_1$ and $D_2$ or, in other words, less than $D_1-D_2/2$, though it may on occasion be less. It is important that the curved surface 21 merge tangentially with the cylindrical wall portion 20. Stated differently, the transition region between the orifice and the wall of the circular cavity consists of a surface of revolution defined by a generatrix revolved about the longitudinal axis of the cavity formed by the wall portion 20. That generatrix has a radius R of curvature no greater than the difference between the diameter of the cavity and the diameter of the orifice 22 and not less than one-half that difference. The surface of revolution, of course, is generated with the generatrix positioned with one end portion tangential to the wall or side 20 of the cavity and the opposite end then terminates at the entrance to the orifice 22. More particularly, the generatrix with one end tangential with the cylindrical side of said cavity has its opposite end terminating at the orifice with the intermediate portion being continuously and smoothly concave toward the longitudinal axis of said cavity. As shown by the specific examples appearing hereinafter, the transition region as above defined acts to establish, i.e., to control the magnitude of the extruding pressure to be proportional to the reduction in area between the workpiece and the shank portion and to be of a lesser order than in the case of conically shaped transition regions.

To force a portion of the workpiece 17 through the orifice 22 and extrude the shank 16, endwise pressure is applied to the workpiece by means of a punch 28. The curved surface 21 of the extrusion die 18 constrains the adjacent part of the workpiece 17 as it is forced through the die to cause the surface portion of the workpiece first to flow inwardly toward the axis of the workpiece in a smooth convex curve and then abruptly to turn and flow parallel to the axis. The side wall of the workpiece within the portion of the die defined by the straight side wall portion 20 is, of course, constrained by the die against any substantial deformation during the extrusion. The extrusion is terminated when sufficient metal has been extruded through the orifice 22 to form the shank of the desired article and the head part 19 has a volume substantially equal to the head part of the finished article. The partially formed article 30 is then removed from the extrusion die 18 by retracting the punch 28 and pushing the article 30 outwardly of the die by means of a knockout pin 29 and the article is thereupon transferred to a second station for further working.

Figure 6:
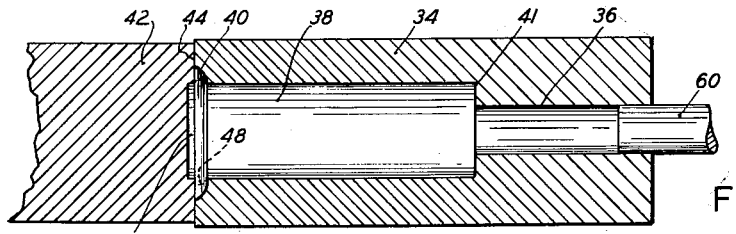
FIG. 6 is a sectional view showing a holding die and an upsetting die utilized in a subsequent forming step.

In the illustrated embodiment, the partialy formed article 30 is transferred from the extrusion die 18 to a forming die 34, illustrated in FIG. 6, having a cavity conforming to the configuration of the finished article 12. The cavity in the die block 34 includes a shank receiving portion 36 and a head part receiving portion 38. The cavity portion 38 is, in this instance, formed with a square bottom and the die face is formed with a recessed rim 40 about the cavity 38 conforming to the flange portion 14 of the finished part 10. The cavity portion 38 is of the same length as the head part 12 of the article 10 and it will be apparent, therefore, that upon insertion of the workpiece 30 into the forming die 34, a portion of the head part 19 will protrude from the die.

After insertion of workpiece 30 into the forming die 34, a blow is applied to the end of the head part 19 to force the same inwardly of the die and to cause the workpiece to fill up the inner corner 41 of the die cavity and thus form the square shoulder desired in the finished article 10. This blow may be applied by a punch 42 having a planar face 44 provided with a shallow, cylindrical recess 46 of a diameter sufficient to receive and constrain the outer end of the workpiece head part 19 during the first blow. During this blow the outer end of the workpiece will bloom slightly, such as indicated at 48 in FIG. 4, into the die recess 40.

Figure 7:
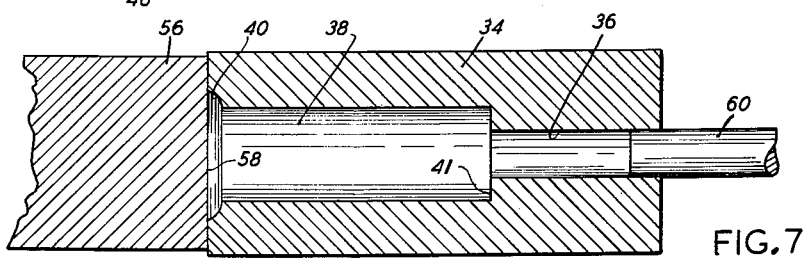
FIG. 7 is a sectional view showing the holding die and final upsetting die which cooperate to form the article of FIG. 1.

As shown in FIG. 7, the end of the workpiece is then struck another blow with a second punch 56 having a flat face 58 which will complete the upsetting of the outer end of the workpiece into the die recess portion 40 to finish the formation of flange 14 of the article 10. Thereafter the punch 56 is retracted and the completed article 10 is removed from the die 34 by means of the knock-out pin 60.

The article 10 is an example of components that heretofore could be made satisfactorily only by machining processes which obviously are slower, waste more material, and are more expensive than the present process. Upsetting a head of the length and volume of the head 12 from wire or rod stock of the diameter of the shank 16 would require and upset of approximately 23 or 24 diameters and would not be feasible because of the tendency of the stock to fold or snake during the gathering of the metal as mentioned previously resulting in a very poor grain structure.

While attempts have been made to produce articles having a large head and smaller shank by extruding a shank portion from a blank workpiece, the extrusion processes previously used have not been commercially feasible within the ranges herein considered. Heretofore, extrusion has been carried out in dies wherein the blank receiving cavity has been formed with a conical surface converging to the orifice through which the shank is to be extruded. As compared to extrusions made in a curved bottom die in accordance with the present invention, such prior processes required much greater pressures to achieve the extrusion necessitating larger and more expensive equipment and, of course, more power. The greater ease of extrusion in curved bottom dies is dramatically shown by the results of several tests comparing the pressure required to obtain a given reduction in a curved bottom die to the pressure required to obtain the same reduction in a conical bottom die with an angle of convergence of 15° with respect to the die axis. Samples of AISI 1016 steel having an initial tensile strength of about 60,000 p.s.i. were reduced from a diameter of 0.203 inch to 0.139 inch, a reduction of about 53 percent in area. A pressure of 8 tons was required to make the extrusion in a curved bottom die where as about 15 tons pressure was required to make the extrusion in a conical bottom die. In another test a workpiece of AISI 1035 steel having an initial tensile strength of about 85,000 p.s.i. was reduced from a diameter of 0.245 inch to a diameter of 0.132 inch, a reduction of about 71 percent in cross sectional area. In a curved bottom die, 18 tons pressure was required while about 41 tons were required in a conical bottom die. In another test a workpiece of AISI 1018 steel having an initial tensile strength of about 64,000 p.s.i. was reduced from a diameter of 0.490 inch to 0.169 inch in a curved bottom die, a reduction of about 88 percent in cross-sectional area, with a pressure of 35 tons being required. A similar reduction was attempted in a conical bottom die. Extrusion barely commenced at an application of 90 tons pressure when the punch failed.

In addition to the substantial reduction in pressure made possible through the use of the process of the present invention, the useful life of the extrusion die is greatly increased. Again, in the case of conically tapered extrusion dies, the useful life diminishes progressively and quite rapidly as reductions exceed 40 to 50 percent. This is believed due to wear, or erosion, of the tapered shoulder over the area of initial contact thereof by the workpiece, resulting in a progressive increase in frictional resistance to the movement of the metal and ultimate early failure of the die. According to the present invention, dies for effecting reduction even in the range of 70 and 80 percent have a satisfactorily long, useful life.

Figure 8:
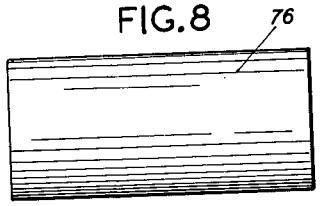
FIG. 8 is a side view of a length of stock or workpiece such as is used in making a bolt blank typical of the product which may be made in accordance with the invention.
Figure 12:
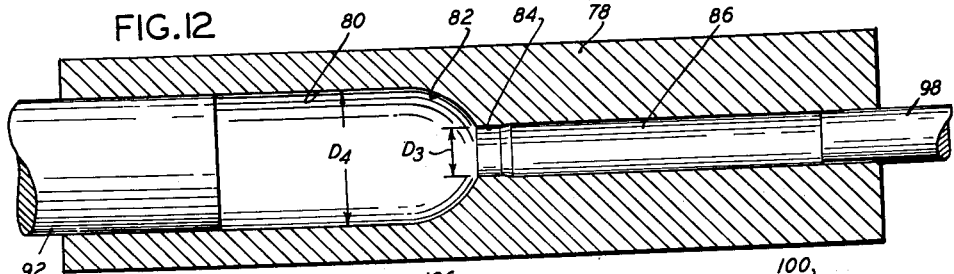
FIG. 12 is a cross-section of the extrusion die utilized in forming the workpiece as it is shown in FIG. 9.
Figure 13:
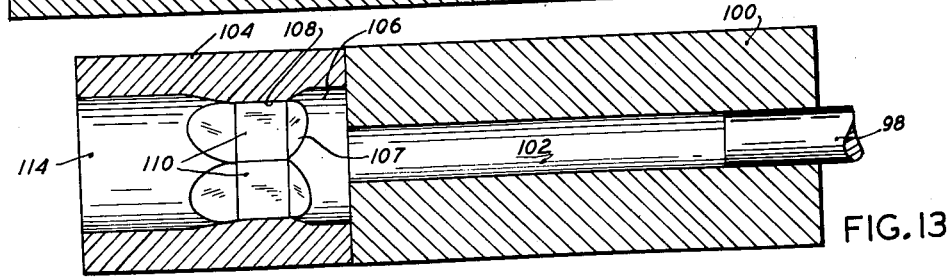
FIG. 13 is a sectional view of the holding die and head extrusion die utilized to form the head as shown in FIG. 10.

To further illustrate the invention, the employment thereof in the manufacture of hex washer head bolt blanks 68 is illustrated in FIGS. 8 to 14, inclusive. As will be noted with reference first to FIG. 11, such blanks after the extrusion and head forming operations of the invention comprise an elongate shank 70 and a hexagonal head 72 having an enlarged base, or a washer 74, integral therewith. The volume of the head 72 is such that to form the same from wire stock of the diameter of the shank 70 would require upsetting a length of more than 24 diameters. As an initial step, a cylindrical workpiece 76, as shown in FIG. 8, of predetermined length is severed from a length of stock material (not shown) of substantially the same diameter as the distance between the peaks of the head 72. The volume of the workpiece 76 is preferably substantially equal to the volume of the bolt blank to be formed. The workpiece 76 is first positioned in an extrusion die 78, such as shown in FIG. 12, formed with a cavity including a straight side wall portion 80 of a diameter $D_3$ sufficient just to admit the workpiece 76 and of a length preferably slightly greater than that of the workpiece 76. The inner end of the die cavity is formed as a concavely curved feed surface 82 terminating at a circular extrusion orifice 84 having a predetermined diameter $D_4$ substantially equal to the diameter of the shank 70. The extrusion die is basically similar to the die described with reference to FIG. 5 and need not be further described in detail.

Figure 9:
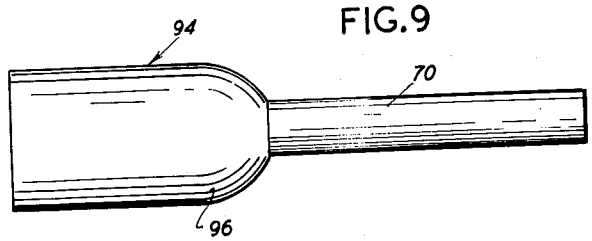
FIG. 9 shows the workpiece after extrusion of a shank therefrom.
Figure 10:
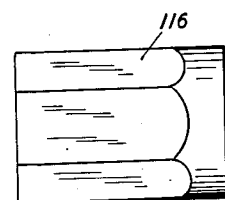
FIG. 10 is a side elevation of the workpiece after the partial formation of the head thereof.
Figure 11:
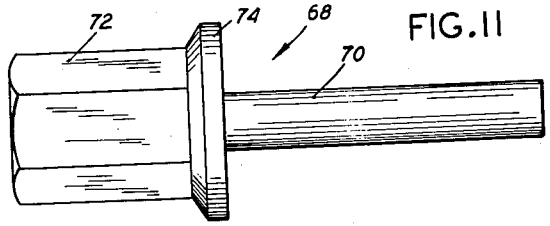
FIG. 11 is an elevation of the completed bolt blank.

As previously described, endwise pressure is applied to the workpiece 76 by means of a punch 92 which is caused to move to a predetermined limit position within the die cavity so as to extrude a predetermined portion of the workpiece to form a partially formed article 94, as shown in FIG. 9, having an elongated shank portion 70 conforming in dimension to the shank 70 of the bolt blank and a substantially unworked head part 96 having a volume substantially equal to the head 72 and washer 74 of the bolt blank.

After extrusion of the shank 70, the partially finished workpiece 94 is extracted from the die 78 in any suitable manner as, for example, by a knock-out pin 98 and the shank 70 is positioned in a holding die 100 (FIG. 13) having an aperture 102 of a diameter sufficient snugly to receive the shank 70. The head part 96 is then engaged with an extrusion die 104 having a cavity including a cylindrical entrance portion 106 of slightly greater diameter than the diameter of the head part 96 and rearwardly of which are converging surface portions 107 leading to a hexagonal orifice 108 defined by six flats 110, the orifice in cross-section being substantially the same as the cross section of the hex head 72. The orifice 108 is of relatively short length, the cavity being enalrged as indicated at 114 inwardly of the orifice to prevent seizure of the portion of the head part extruded through the orifice. The extrusion die 104 is forced over the head part 96 and the later is progressively extruded through the orifice 108 to shape the head part as shown at 116 in FIG. 10.

Figure 14:
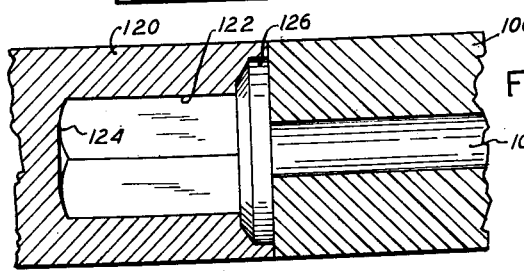
FIG. 14 is a sectional view through the holding die and heading die utilized in the final shaping of the head part of the bolt blank of FIG. 11.

The head part 116 is thereafter worked to the final shape 72 by striking the head part 116 with an upsetting die 120, such as shown in FIG. 14, having a die cavity 122 complementary to the desired configuration of the finished head. The inner end 124 of the cavity 122 engages the end of the head part 116 to force the metal of the head part 116 toward the die 100 and cause the portion of the workpiece opposite the washer defining recess 126 of the die to bloom or upset to fill the recess. After the head 72 and washer 74 are thus completely formed, the die 120 is retracted and the formed bolt blank knocked from the die 100 by means of a knockout pin 98 or other suitable means. The bolt blank can then be processed as desired.

The advantages attendant to the manufacture of the article 10 and discussed hereinbefore also accrue with the manufacture of the bolt blank 68 in accordance with the invention; that is to say, the bolt blank may be manufactured at a lower cost and at a greater rate with the process of the invention as compared with other processes. A further advantage accruing from the use of the process of the invention in the manufacture of the bolt blank 68 is that the great reduction of the workpiece 76 in forming the shank 70 causes a great increase in the tensile strength of the shank.

For, example, samples of AISI 1038 type of steel having an average tensile strength of about 84,900 p.s.i. were reduced in cross section by about 70 percent by extrusion. The average tensile strength of the extruded steel was increased approximately 60 percent, or to about 136,650 p.s.i. The increase in the tensile strength of the bolt shank attained by the practice of the present invention is of advantage since bolts of this type are frequently used in applications wherein a substantial axial load is imposed upon the bolts. When such bolts are manufactured by machining processes, it is frequently necessary to utilize special, expensive stock or resort to heat treatment, or both, so that the finished product will have the required strength. Furthermore, since with the process of the invention the head portion 94 is substantially unworked in the initial extrusion, no difficulty is encountered in the subsequent extrusion of the flats thereon and the upsetting to form the washer 72 and intermediate annealing steps are not necessary. Obviously, the great increase in strength obtained by the cold working of the shank portion possible in accordance with the invention will be of value in the manufacture of many items.

Finally, it should be observed that the bolt blanks 68 and other similar articles, when manufactured in accordance with the present invention, have a grain structure that in almost ever instance is more desirable than that resulting from manufacture of such articles by other processes.

While I have described my invention with respect to the manufacture of two different articles, it is to be understood that the process of the invention is not limited thereto but may be applied to the manufacture of numerous articles and that the invention permits a modification in arrangement and detail. I claim as my invention all such modifications as come within the true spirit and scope of the appended claims.

I claim:

1. The method of cold forming a headed article from a cylindrical workpiece of metal in which the shank of the article is of small diameter as compared with the head portion and of materially enhanced strength as compared with the strength of the workpiece, said method comprising:

(a) providing a cylindrical workpiece of metal having a cross-sectional area at least twice that of the shank portion of the article to be formed, (b) applying to the entire surface of one end of said workpiece a pressure which develops flow of metal through a die orifice so as to extrude therethrough said shank portion having a cross-sectional area at least less than one-half that of said workpiece, (c) supporting the cylindrical side wall of said workpiece throughout the entire length and circumference thereof against all substantial lateral deformation throughout the period of application of said pressure by placing the same in a circular cavity as a guide, (d) in the transition region between a circular portion of said cavity and the orifice, controlling the magnitude of said pressure to be proportional to the reduction in area between the workpiece and said shank portion by inducing a smooth, uniform and progressive inward flow of metal from the outer portion of said workpiece toward said orifice and along a surface of revolution defined by a generatrix revolved about the longitudinal axis of said cavity, said generatrix having a curvature which at one end portion is tangential with the circular wall of said cavity and at the opposite end portion terminates at said orifice, the intermediate portion of said generatrix having a curvature no greater than the difference between the diameter of said cavity and the diameter of the orifice and not less than one-half that difference, (e) producing a strength of a higher order than that of the metal of said workpiece by partial working of the metal within said transition region, thereby improving the grain structure within that transition region and by thoroughly working said metal by its inward flow toward said orifice and thence through said orifice for production of said shank portion, (f) terminating the application of said pressure when the volume of the unworked portion of said workpiece is equal to that of the head portion to be formed in production of a shaped blank with a transition region conforming with said surface of revolution and of metal which has been worked during formation of said shank portion, (g) enclosing and supporting said shank portion on all sides thereof, (h) while said shank portion is so enclosed and supported, forming said head portion largely from the unworked metal spaced from said transition region and reshaping said transition region to establish a thoroughly and uniformly cold-worked metal portion in the critical juncture between said head portion and said shank portion.

2. The method of cold forming a headed article from a cylindrical workpiece of steel in which the shank of the article is of small diameter as compared with the head portion and of materially enhanced strength as compared with the strength of the workpiece, said method comprising:

(a) providing a cylindrical workpiece of steel having a cross sectional area at least twice that of the shank portion of the article to be formed, (b) applying to the entire surface of one end of said workpiece a pressure which develops flow of steel through a die orifice so as to extrude therethrough said shank portion having a cross sectional area at least less than one-half that of said workpiece, (c) supporting the cylindrical side wall of said workpiece throughout the entire length and circumference thereof against all substantial lateral deformation throughout the period of application of said pressure by placing the same in a circular cavity as a guide, (d) in the transition region between a circular portion of said cavity and the orifice, controlling the magnitude of said pressure to be proportional to the reduction in area between the workpiece and said shank portion by inducing a smooth, uniform and progressive inward flow of steel from the outer portion of said workpiece toward said orifice and along a surface of revolution defined by a generatrix revolved about the longitudinal axis of said cavity, said generatrix having a curvature which at one end portion is tangential with the circular wall of said cavity and at the opposite end portion terminates at said orifice, the intermediate portion of said generatrix having a curvature no greater than the difference between the diameter of said cavity and the diameter of the orifice and not less than one-half that difference, (e) producing a strength of a higher order than that of the steel of said workpiece by partial working of the steel within said transition region thereby improving the grain structure within that transition region and by thoroughly working said steel by its inward flow toward said orifice and thence through said orifice for production of said shank portion, (f) terminating the application of said pressure when the volume of the unworked portion of said workpiece is equal to that of the head portion to be formed in production of a shaped blank with a transition region conforming with said surface of revolution and of steel which has been worked during formation of said shank portion, (g) enclosing and supporting said shank portion on all sides thereof, (h) while said shank portion is so enclosed and supported, forming said head portion largely from the unworked steel spaced from said transition region and reshaping said transition region to establish a thoroughly and uniformly cold-worked steel portion in the critical juncture between said head portion and said shank portion.

3. The method of cold forming a headed article from a cylindrical workpiece of steel in which the shank of the article is of small diameter as compared with the head portion and of materially enhanced strength as compared with the strength of the workpiece, said method comprising:

(a) providing a cylindrical workpiece of steel having a cross sectional area at least twice that of the shank portion of the article to be formed, (b) applying to the entire surface of one end of said workpiece a pressure which develops flow of steel through a die orifice so as to extrude therethrough said shank portion having a cross sectional area at least less than one-half that of said workpiece, (c) supporting the cylindrical side wall of said workpiece throughout the entire length and circumference thereof against all substantial lateral deformation throughout the period of application of said pressure by placing the same in a circular cavity as a guide, (d) in the transition region between a circular portion of said cavity and the orifice, controlling the magnitude of said pressure to be proportional to the reduction in area between the workpiece and said shank portion by inducing a smooth, uniform and progressive inward flow of steel from the outer portion of said workpiece toward said orifice and along a surface of revolution defined by a generatrix revolved about the longitudinal axis of said cavity, said generatrix having a radius of curvature no greater than the difference between the diameter of said cavity and the diameter of the orifice and not less than one-half that difference and having one end portion tangential with the circular wall of said cavity and the opposite end portion terminating at said orifice, (e) producing a strength of a higher order than that of the steel of said workpiece by partial working of the steel within said transition region thereby improving the grain structure within that transition region and by thoroughly working said steel by its inward flow toward said orifice and thence through said orifice for production of said shank portion, (f) terminating the application of said pressure when the volume of the unworked portion of said workpiece is equal to that of the head portion to be formed in production of a shaped blank with a transition region conforming with said surface of revolution and of steel which has been worked during formation of said shank portion, (g) enclosing and supporting said shank portion on all sides thereof, (h) while said shank portion is so enclosed and supported, forming said head portion largely from the unworked steel spaced from said transition region and reshaping said transition region to establish a thoroughly and uniformly cold-worked steel portion in the critical juncture between said head portion and said shank portion.

References Cited in the file of this patent

UNITED STATES PATENTS

| | | |
|---|---|---|
| 1,642,696 | Rateike | Sept. 20, 1927 |
| 1,832,167 | Wilcox | Nov. 17, 1931 |
| 2,064,918 | Kaufman | Dec. 22, 1936 |
| 2,335,590 | Gersman | Nov. 30, 1943 |
| 2,660,302 | Gersman | Nov. 24, 1953 |
| 2,750,034 | Gersman | June 12, 1956 |
| 2,806,596 | Dodds | Sept. 17, 1957 |

FOREIGN PATENTS

| | | |
|---|---|---|
| 546,706 | Germany | Mar. 19, 1932 |
| 622,506 | Germany | Nov. 29, 1935 |
| 278,340 | Switzerland | Jan. 3, 1952 |

OTHER REFERENCES

Draht, Coburg, No. 1, page 5, January 1952.

Die Design Handbook, American Society of Tool Engineers, McGraw Hill, 1955, pages 14–26 and 14–27.

"The Iron Age," pages 85–87, May 29, 1958.